United States Patent
Davis et al.

(10) Patent No.: US 6,411,919 B1
(45) Date of Patent: Jun. 25, 2002

(54) METHOD AND APPARATUS FOR GENERATING CABLE OCCUPANCY VOLUMES

(75) Inventors: Jonathan Earl Davis, Schenectady; Russell Scott Blue, Clifton Park; Steven Eric Linthicum, Niskayuna; William Edward Lorensen, Ballston Lake; Christopher Richard Volpe, Niskayuna., all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/405,065

(22) Filed: Sep. 27, 1999

(51) Int. Cl.$^7$ .............................................. G01B 11/28
(52) U.S. Cl. ................ 702/156; 174/113 R; 250/358.1; 439/61; 702/30; 702/35
(58) Field of Search ........................... 174/43; 219/544, 219/553; 307/147, 33, 36, 113; 702/156, 157, 158, 159, 164, 166, 183, FOR 123, FOR 124, FOR 134, FOR 145–FOR 149, FOR 155, FOR 170

(56) References Cited

U.S. PATENT DOCUMENTS

| | | | | |
|---|---|---|---|---|
| 4,979,125 A | * | 12/1990 | Kwun et al. | 702/35 |
| 5,798,923 A | * | 8/1998 | Laskowski | 702/5 |
| 5,885,089 A | * | 3/1999 | Ruque | 439/61 |
| 5,902,962 A | * | 5/1999 | Gazdzinski | 174/113 R |
| 6,144,032 A | * | 11/2000 | Gazdzinski | 250/358.1 |
| 6,259,993 B1 | * | 7/2001 | Hori | 702/30 |

\* cited by examiner

Primary Examiner—John S. Hilten
Assistant Examiner—John Le
(74) Attorney, Agent, or Firm—Jean K. Testa; Jill M. Breedlove

(57) ABSTRACT

An analytical method for determining a cable occupancy volume includes obtaining a cable length and identifying a number and location of a plurality of cable supports for supporting the cable along its length. The cable occupancy volume that is generated is based on the cable length, the number of supports and the location of the supports. The instructions for practicing the method are encoded on a computer-readable storage medium.

14 Claims, 4 Drawing Sheets

METHOD AND APPARATUS FOR GENERATING CABLE OCCUPANCY VOLUMES

FIELD OF THE INVENTION

This invention relates to an analytical method for determining a cable occupancy volume and, more particularly, to a method for optimizing cable bracket placement to facilitate reduced weight and reduced equipment usage and apparatus for practicing the method.

BACKGROUND OF THE INVENTION

Cabling systems (electrical, fiber optic, etc.) are used in numerous applications where conditions arise that may be detrimental to the cabling system. It is vital for longevity of the cabling systems that the cabling avoid hazards such as rubbing, high temperature or corrosive environments. Failure to avoid such hazards can lead to increased maintenance, down time, and even catastrophic failure. In order to prevent deterioration of cabling, designers and/or installers position cable brackets to restrain motion of the cables and limit proximity to harmful elements. This installation of brackets is typically done in an ad hoc fashion, without analytical means to optimize the design.

BRIEF SUMMARY OF THE INVENTION

An analytical method for determining a cable occupancy volume includes obtaining a cable length and identifying a number and location of a plurality of cable supports for supporting the cable along its length. The cable occupancy volume that is generated is based on the cable length, the number of supports and location of the supports. Instructions for practicing the method can be encoded on computer-readable storage media.

DETAILED DESCRIPTION OF THE INVENTION

In a preferred embodiment of the invention, a cable occupancy volume is generated based on a cable length and the number and location of cable supports (e.g., brackets). The cable occupancy volume is then compared to a three dimensional model of the cable installation to evaluate cable wear, rubbing, clearance, and environmental concerns. The method for generating the cable occupancy volume may be implemented on a general purpose computer having a display and a user interface, and being programmed to perform the method described herein.

Figure 1:
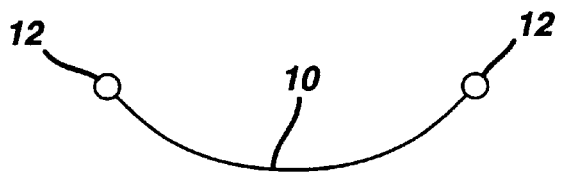
FIG. 1 illustrates a cable suspended between two supports.

As shown in FIG. 1, a cable 10 is secured to two cable supports 12. Through the user interface, the user can alter the computer-generated position and/or number of the cable supports to determine the effect of the cable occupancy volume.

When the user specifies the locations for cable supports 12, the extent of the cable 10 motion between the two fixed supports 12 is determined. Given two fixed positions of the support locations, the method assumes that the cable supports are secure and that no sliding of the cable is possible between supports. The method also assumes that the cable 10 is infinitely flexible and inelastic, and thus unvarying in length between the supports. Using the cable length and the positions of each of the supports as foci, an ellipse 14 can be generated whose major axis passes through the two fixture points, as shown in FIG. 2.

Figure 2:
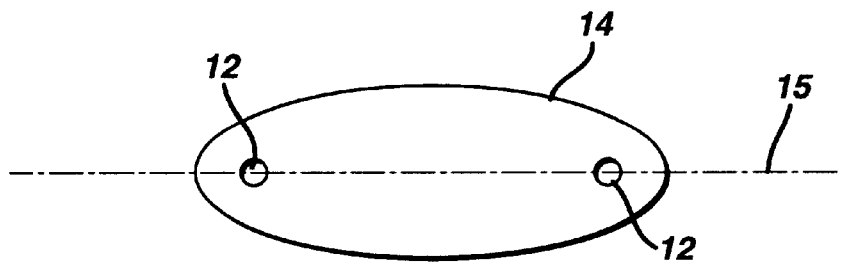
FIGS. 2–3 depict steps in determining formation of a cable occupancy volume.
Figure 3:
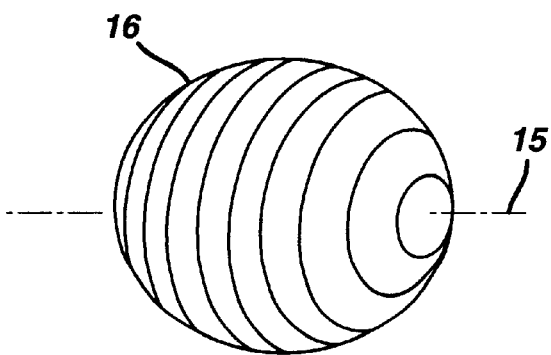

The ellipse shown in FIG. 2 is next rotated at regular angular intervals about the major axis 15 of the ellipse to generate a polygonal model of an ellipsoid 16, shown in FIG. 3. The specified angular interval determines the density of the polygonal model. The resulting ellipsoid 16 represents the region of space in which the infinitely flexible cable can move and provides a bound on the motion and position of cables of finite flexibility. For each intermediate stage along the cable route (i.e., between successive supports), a cable occupancy ellipsoid 16 can be determined; that is, a cable occupancy sub-volume is generated between each pair of supports. The series of the cable occupancy sub-volumes represents the cable occupancy volume for the entire cable.

The cable occupancy volume can now be compared to a three dimensional model of the cable installation to identify issues of wear, rubbing, or clearance with high temperature or corrosive substances. In addition, adjacent cable occupancy volumes can be analyzed for interference in the event of cable tangling or collision.

Figure 4:
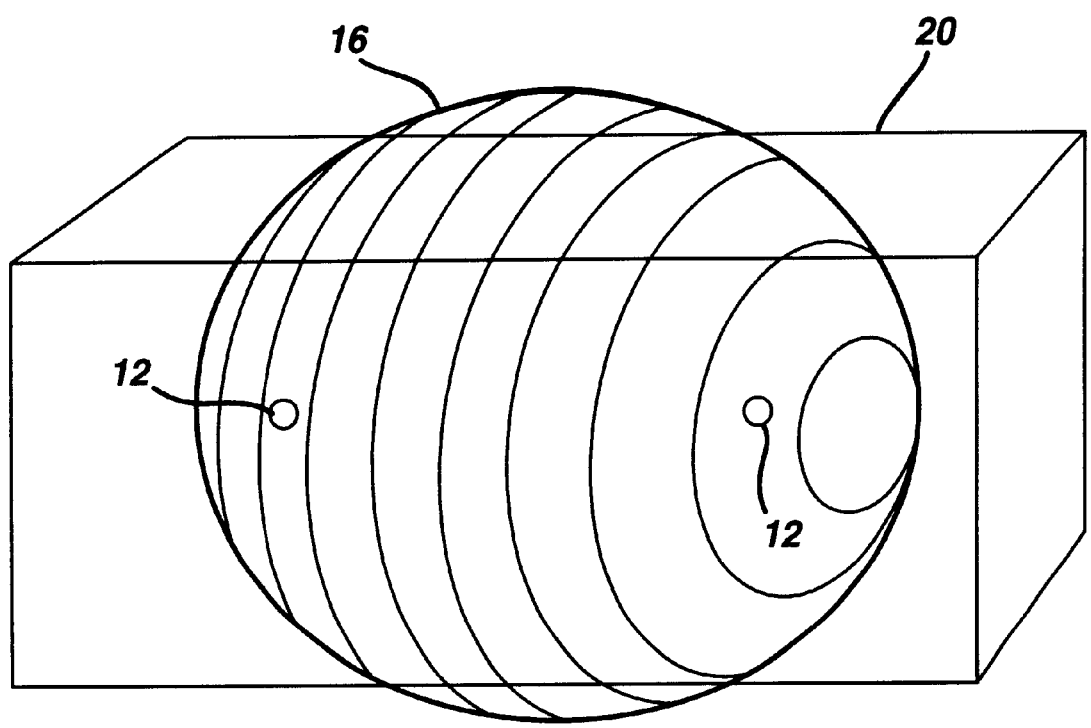
FIGS. 4–5 depict steps in comparing a cable occupancy volume to cable occupancy volume limits.

FIG. 4 depicts an exemplary comparison of cable occupancy volume to a cable installation model. The cable installation model represents the physical structure (walls, equipment, racks, etc.) in which the cable is to be installed. The cable occupancy volume is compared to the cable installation model to determine if the support locations are acceptable. The cable installation model, shown in FIG. 4, may include cable occupancy volume limits represented by rectangular volume 20. Although the cable occupancy volume limits are shown as a rectangular volume, it is understood that more complex geometries may be used. The cable occupancy volume limits 20 may be generated based on factors such as wear, rubbing and clearance from hazards (e.g. high temperature, corrosive materials, etc.). As shown in FIG. 4, the user has designated two supports 12 which results in a cable occupancy volume 16 that exceeds the cable occupancy volume limits 20. The system can then notify the user of the error.

Figure 5:
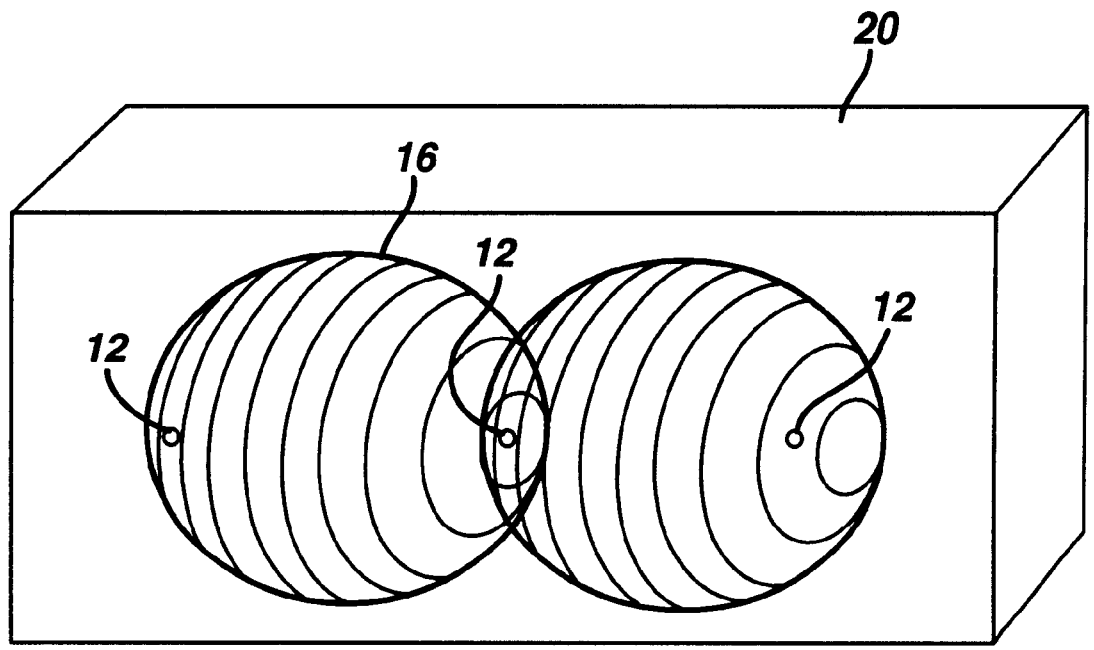

FIG. 5 depicts the cable of FIG. 4 installed using three supports 12. As shown in FIG. 5, the cable occupancy volume 16 does not exceed the cable occupancy volume limits 20.

Figure 6:
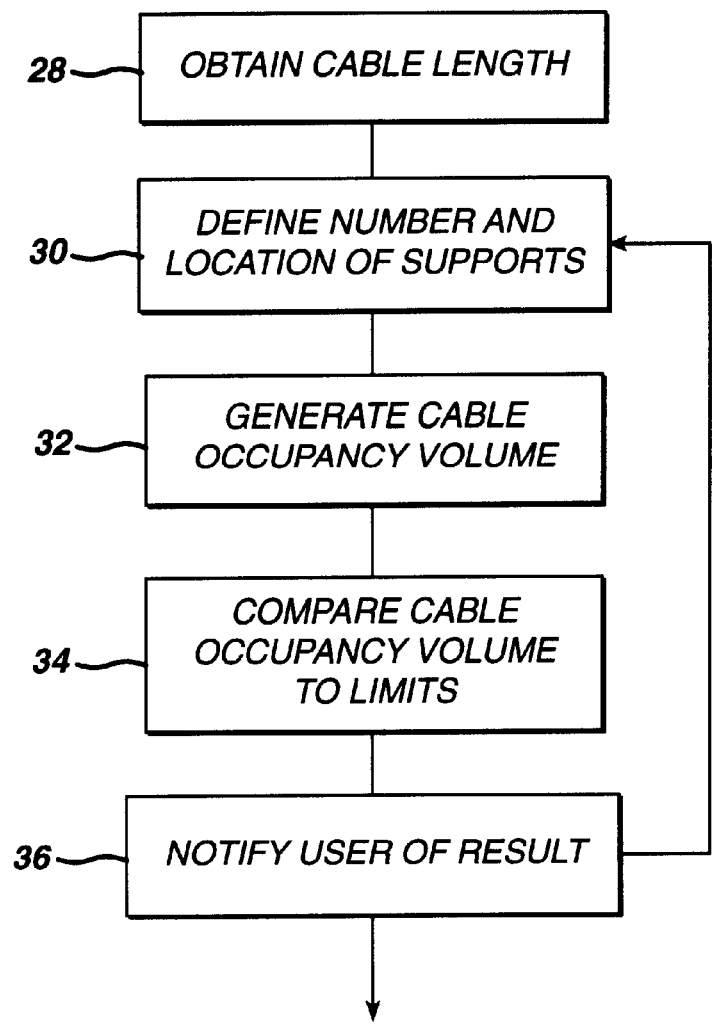
FIG. 6 is a flowchart of a process of forming cable occupancy volume in an exemplary embodiment of the invention.

FIG. 6 is a flowchart of an exemplary embodiment of the invention. At step 28, the cable length is obtained. The cable length may be supplied by the user or retrieved from another source (e.g., computer memory). At step 30, the user identifies the number and locations of the cable supports. At step 32, the cable occupancy volume for the cable is determined based on the number and locations of the supports. At step 34, the cable occupancy volume is compared to cable occupancy volume limits and at step 36 the user is notified of the result of the comparison. If necessary, flow may proceed back to step 30 to allow the user to adjust the number and/or location of the supports.

Figure 7:
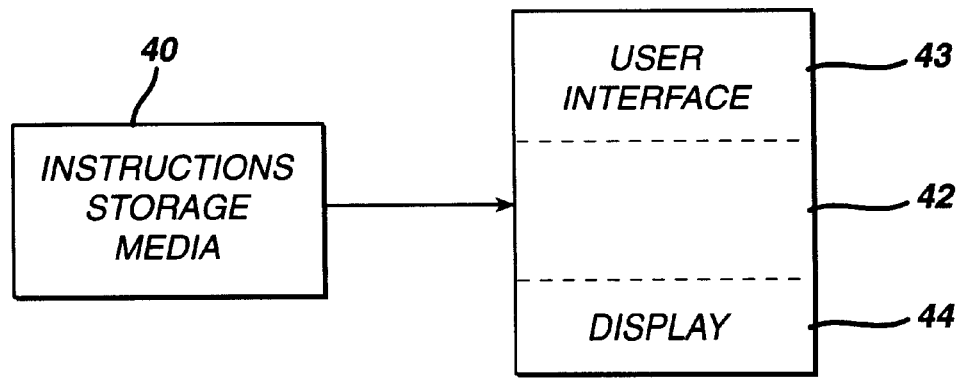
FIG. 7 is a block diagram of a computer responsive to instructions for determining formation of a cable occupancy volume.

As shown in FIG. 7, the invention can be embodied in the form of computer-implemented processes and apparatuses for practicing those processes. Alternatively, the invention can be embodied in the form of computer program code made up of instructions contained in tangible media 40, such as floppy diskettes, CD-ROMs (compact disk, read only memories), computer hard drives, or any other computer-readable storage medium, wherein, when the computer program code is loaded into and executed by a computer 42, which includes a user interface 43 and a display 44, the computer becomes an apparatus for practicing the invention. Similarly, the invention, if embodied in the form of computer program code may, for example, be transmitted over a transmission medium such as electrical wiring, cabling, or fiber optics, or transmitted via electromagnetic radiation and, when the computer program code is loaded into and executed by a computer, the computer becomes an apparatus for practicing the invention. When implemented on a general-purpose microprocessor, the computer program code segments configure the microprocessor to create specific logic circuits.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for determining a cable occupancy volume comprising:

obtaining a cable length;

identifying a number and location of a plurality of cable supports for supporting said cable length; and generating said cable occupancy volume based on said cable length, said number of cable supports and said location of said cable supports, and the step of generating said cable occupancy volume includes generating a cable occupancy sub-volume for each pair of adjacent supports.

2. The method of claim 1 wherein the step of generating the cable occupancy volume comprises:

generating a geometric shape in response to said number and location of cable supports; and rotating said geometric shape to generate said cable occupancy volume.

3. The method of claim 2 wherein said geometric shape comprises an ellipse and said cable occupancy volume comprises an ellipsoid.

4. The method of claim 2 comprising, after the step of generating the cable occupancy volume:

comparing said cable occupancy volume to cable occupancy volume limits.

5. The method of claim 1 comprising, after the step of generating a cable occupancy volume:

comparing said cable occupancy volume to cable occupancy volume limits.

6. The method of claim 5 comprising, as a final step:

notifying a user of a result of said comparing.

7. A method for determining a cable occupancy volume comprising:

obtaining a cable length;

identifying a number and location of a plurality of cable supports for supporting said cable length; and generating said cable occupancy volume based on said cable length, said number of cable supports and said location of said cable supports and the step of generating said cable occupancy volume includes generating a geometric shape for each pair of adjacent supports, and rotating each of the geometric shapes to generate a cable occupancy sub-volume for said each pair of adjacent supports.

8. A storage medium encoded with machine-readable computer program code for determining a cable occupancy volume, the storage medium including instruction for causing a computer to implement a method comprising:

obtaining a cable length;

identifying a number and location of a plurality of cable supports for supporting said cable length; and generating said cable occupancy volume based on said cable length, said number of cable supports and said location of said cable supports, wherein said generating said cable occupancy volume includes generating a cable occupancy sub-volume for each pair of adjacent supports.

9. The storage medium of claim 8 where said generating the cable occupancy volume comprises:

generating a geometric shape in response to said number and location of cable supports; and rotating said geometric shape to generate said cable occupancy volume.

10. The storage medium of claim 9 wherein:

said geometric shape comprises an ellipse and said cable occupancy volume comprises an ellipsoid.

11. The storage medium of claim 9 further comprising instructions for causing the computer, after generating said cable occupancy volume, to compare said cable occupancy volume, to compare said cable occupancy volume to cable occupancy volume limits.

12. The storage medium of claim 8 further comprising instructions for causing the computer, after generating said cable occupancy volume, to compare said cable occupancy volume, to compare said cable occupancy volume to cable occupancy volume limits.

13. The storage medium of claim 12 further including, as final instructions, instructions for causing the computer to provide notification of a result of said comparing.

14. A storage medium encoded with machine-readable computer program code for determining a cable occupancy volume, the storage medium including instruction for causing a computer to implement a method comprising:

obtaining a cable length;

identifying a number and location of a plurality of cable supports for supporting said cable length; and generating a cable occupancy volume based on said cable length, said number of cable supports and said location of said cable supports, wherein said generating said cable occupancy volume includes generating a geometric shape for each pair of adjacent supports, and rotating each of the geometric shapes to generate a cable occupancy sub-volume for said each pair of adjacent supports.

* * * * *